United States Patent [19]
Sotom et al.

[11] Patent Number: 5,537,239
[45] Date of Patent: Jul. 16, 1996

[54] OPTICAL TRANSMISSION NETWORK WITH A SWITCHING MATRIX

[75] Inventors: Michel Sotom, Paris; Amaury Jourdan, Savigny sur Orge; Guy Le Roy, Lannion, all of France

[73] Assignee: Alcatel N.V., Amsterdam

[21] Appl. No.: 244,624

[22] PCT Filed: Oct. 11, 1993

[86] PCT No.: PCT/FR93/01005

§ 371 Date: Jun. 3, 1994

§ 102(e) Date: Jun. 3, 1994

[87] PCT Pub. No.: WO94/09601

PCT Pub. Date: Apr. 28, 1994

[30] Foreign Application Priority Data

Oct. 9, 1992 [FR] France ............................... 92 12018

[51] Int. Cl.$^6$ ..................... H04B 10/20; H04J 14/02
[52] U.S. Cl. ..................... 359/117; 359/118; 359/125; 359/164
[58] Field of Search ............... 359/114, 117, 359/120, 121, 127, 128, 164, 118, 125, 173, 165, 166, 119

[56] References Cited

U.S. PATENT DOCUMENTS

| | | | |
|---|---|---|---|
| 4,777,664 | 10/1988 | Khoe | 359/125 |
| 5,319,485 | 6/1994 | Yasui et al. | 359/125 |
| 5,353,145 | 10/1994 | Le Coquil et al. | 359/120 |
| 5,485,297 | 1/1996 | Sotom | 359/128 |

FOREIGN PATENT DOCUMENTS

| | | | |
|---|---|---|---|
| 0492852A3 | 7/1992 | European Pat. Off. | H04L 12/56 |
| WO92/10770 | 6/1992 | WIPO | G02B 6/26 |

OTHER PUBLICATIONS

G. R. Hill, "A Wavelength Routing Approach to Optical Communications Networks", *Proceddings, IEEE Conference on Computer Communications (INFOCOM '88)* Mar. 27–28, 1988, pp. 354–361.

C. A. Brackett, "Dense Wavelength Division Multiplexing Networks: Principles and Applications", *IEEE Journal On Selected Areas In Communication*, Vol. 8, No. 6, Aug. 1990 pp. 948–964.

A. M. Hill, "A Distributed Wavelength Switching Architecture for the TPON Local Network", *Proceedings, International Switching Symposium*, May 27–Jun. 1, 1990, Vol. III, pp. 21–26.

H. Kobrinski et al, "Demonstration of High Capacity in the Lambdanent Architecture: a Multiwavelength Optical Network", *Electronics Letters*, Vol. 23, No. 16, Jul. 30, 1987 pp. 824–826.

R. P. Marsden et al, "Digital Television Routing Systems: A Survey of Optical and Electrical Techniques", *BBC Research Department Report*, No. 3, Mar. 1988, pp. 1–31.

H. Obara et al, "Star Coupler Based WDM Switch Employing Tunable Device with Reduced Tunability Range", *Electronics Letters*, Vol. 28, No. 13, Jun. 18, 1992, pp. 1268–1270.

M. Fujiwara et al, "Line Capacity Expansion Schemes in Photonic Switching", *IEEE Transactions On Parallel and Distributed Systems*, Vol. 1, No. 2, May 1990 pp. 47–53.

Primary Examiner—Leslie Pascal
Assistant Examiner—Rafael Bacares
Attorney, Agent, or Firm—Sughrue, Mion, Zinn, Macpeak & Seas

[57] ABSTRACT

The network includes composite switching matrices (M1, M2, M3), each of which is split between a plurality of nodes (N1, N2, N3) of the network. The nodes are connected together via optical fibers (L3A3, L1A4) conveying wavelength multiplexes and included in the matrices. The matrices include emitters having staggered wavelengths (E2A1,1, ..., E2A2,4), star couplers (C2A1, C2A2), controlled space-division switching matrices (X2A1, ..., X2A4), and wavelength-controlled filters (F2A1,1, ..., F2A4,4). The invention applies to telecommunications.

5 Claims, 4 Drawing Sheets

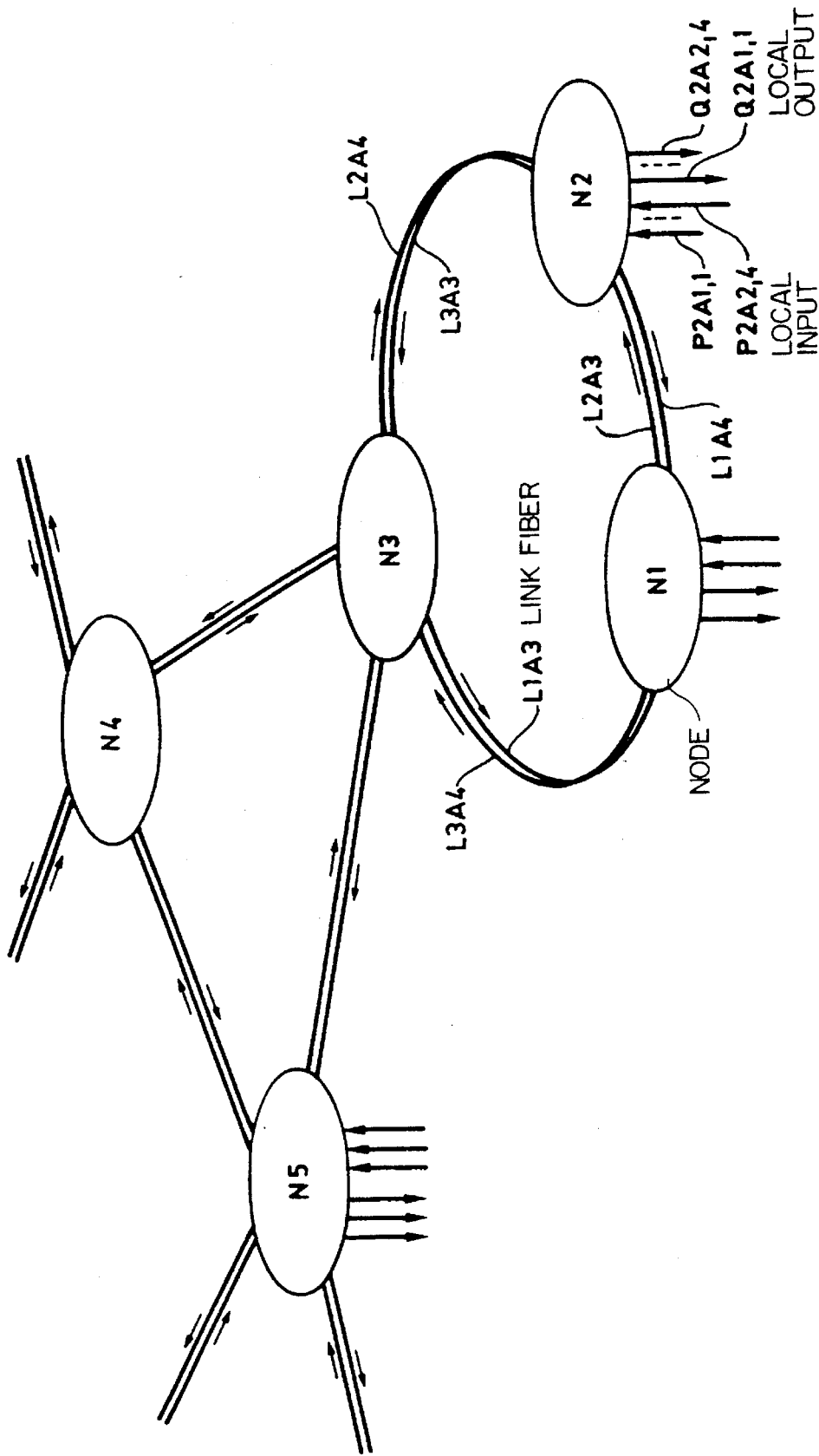

OPTICAL TRANSMISSION NETWORK WITH A SWITCHING MATRIX

BACKGROUND OF THE INVENTION

1. Field of the Invention

The present invention relates to data transmission networks in which calls are made between nodes of the network by means of carrier light waves that carry data and that are guided by optical fibers.

2. Description of the Related Art

In such networks, it is usually necessary to perform routing functions making it possible to transmit to each user only that data which is addressed to the user. Such routing functions may advantageously be provided by optical switching matrices, each of which is conventionally included in a node of the network.

Such networks including such matrices are costly to make, and they may become impossible to make when the number of users increases and makes it necessary to provide higher capacities for the matrices, matrix capacity being defined by the number of inputs and the number of outputs of a matrix.

SUMMARY OF THE INVENTION

A particular object of the present invention is to enable a transmission network of that type to be made simply and cheaply, and to enable the network to be used by a higher number of users.

To this end, the invention provides a transmission network for transmitting data between call ports that can be connected to subscribers to the network by means of guided carrier light waves having a succession of carrier wavelengths, the network including:

a plurality of nodes comprising members for performing controlled routing so as to route said carrier waves on command; and link fibers constituted by optical fibers for conveying data between the nodes, which data is carried by said carrier waves guided by the fibers;

each of said nodes including:

at least one link input and/or at least one link output for receiving data from another one of said nodes and/or for transmitting data to another one of said nodes via respective ones of said link fibers;

at least some of said nodes being local access nodes, each of which further includes at least one local input and/or at least one local output so as to constitute at least one of said call ports, some of said members of the nodes of the network being controlled so as to define routes for said data, each of which routes extends from an upstream end constituted by one of said local inputs receiving the data to a downstream end constituted by one of said local outputs via which the data is to be restored by the network, so that the members in question comprise a set of members constituting at least one switching matrix of the network, the matrix including:

a set of emitters receiving data to be transmitted and having wavelengths at which they emit waves carrying the data;

a set of filters also having wavelengths, each of which filters selectively transmits, at the output of the matrix, those waves whose wavelength is equal to the wavelength of the filter, the wavelengths of the: filters being controlled; and a distribution set for connecting the filters to the emitters so that said controlled routing can be performed by controlling the wavelengths of the filters;

the network being characterized by the fact that at least one of said switching matrices of the network is a composite matrix whose distribution set includes:

a group of passive distributors, the distributors being constituted by star couplers, each of the distributors permanently connecting each of its inputs to all of its outputs, the group of passive distributors being connected to said set of emitters; and a group of active distributors of the type sometimes referred to as space-division switching matrices, each of which is capable of connecting each of its inputs to an output selected by the distributor being controlled, it being possible to select any one the outputs of the distributor, the group of active distributors being connected to said group of passive distributors, said set of filters being connected to the group of active distributors;

at least one of said composite matrices constituting a split matrix comprising members that are included in two different nodes and that are connected together via one of said link fibers guiding carrier Waves that have a plurality of different carrier wavelengths.

BRIEF DESCRIPTION OF THE DRAWINGS

A particular embodiment of the present invention is described below by way of non-limiting example and with reference to the accompanying drawings. When the same element is shown in more than one figure, it is designated by the same reference. In the drawings:

FIG. 1 is an overall view of a network of the invention; and

DETAILED DESCRIPTION OF THE PREFERRED EMBODIMENTS

It is to be understood that, in practice, such nodes include numerous members other than those which are shown and described below with the sole purpose of enabling the invention to be understood.

With the sole purpose of simplifying the description, the three nodes N1, N2, and N3 are assumed to be mutually identical, as are the three switching matrices M1, M2, and M3 constituted by the nodes. When two members belonging to two different matrices are identical and identically disposed, they are designated by the same references, except for the first digit after the letters, which digit is the digit that designates the matrix to which the member belongs. For example, a passive distributor of matrix M1 is designated by the reference C1A2, the corresponding distributor of matrix M3 being designated by the reference C3A2, the digit 2 after the second letter constituted by an A, a B, or a C indicating that the distributor is a second distributor in both cases. When the reference of a member starts with a letter and includes three digits, e.g. the emitter E1A2,4, the first and second digits such as 1 and 2 respectively designate the matrix and a group to which the member belongs, and the third digit designates a rank of the member in the group.

Figure 2A:
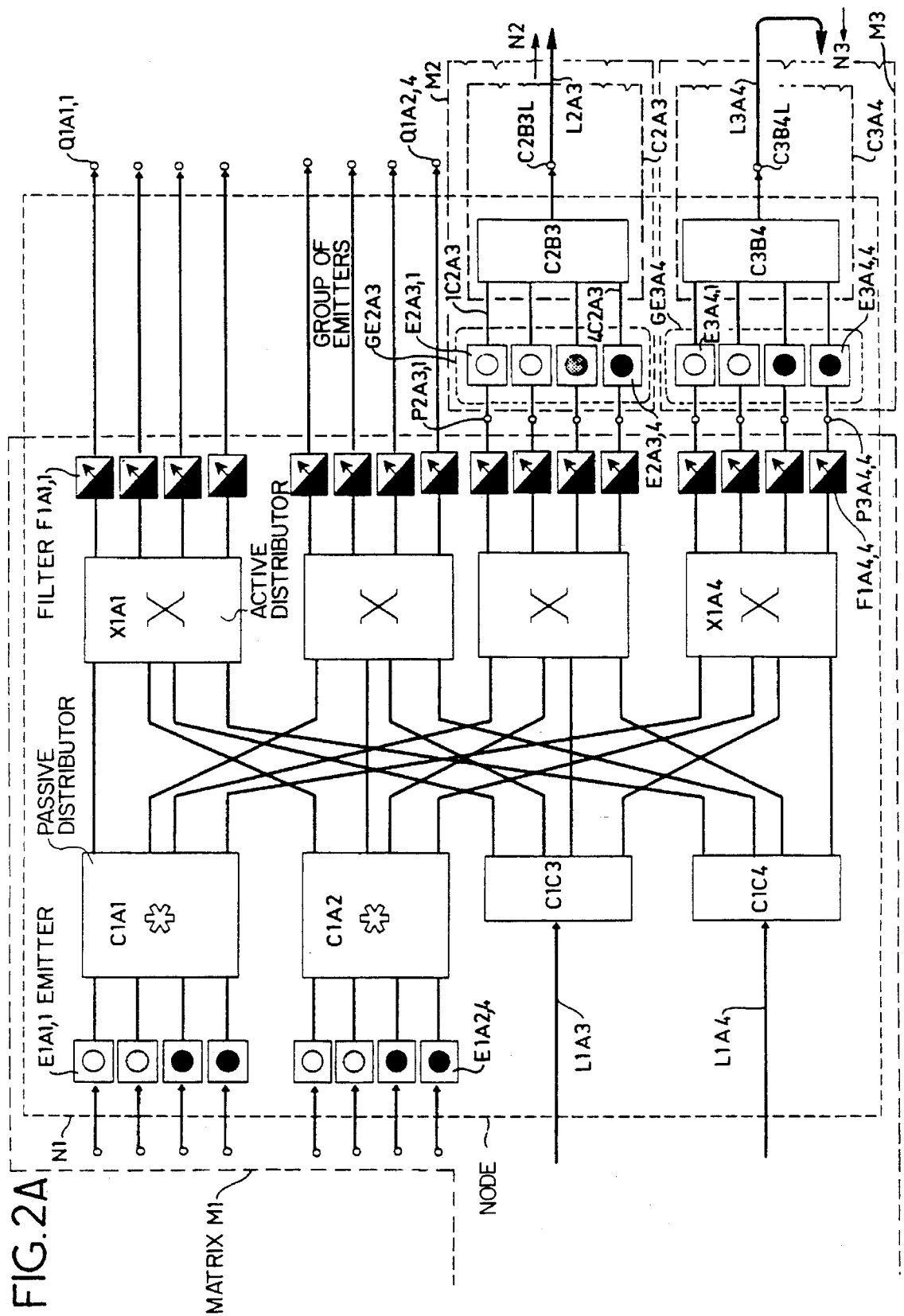
FIGS. 2A, 2B, and 2C are views showing three nodes of the invention.
Figure 2B:
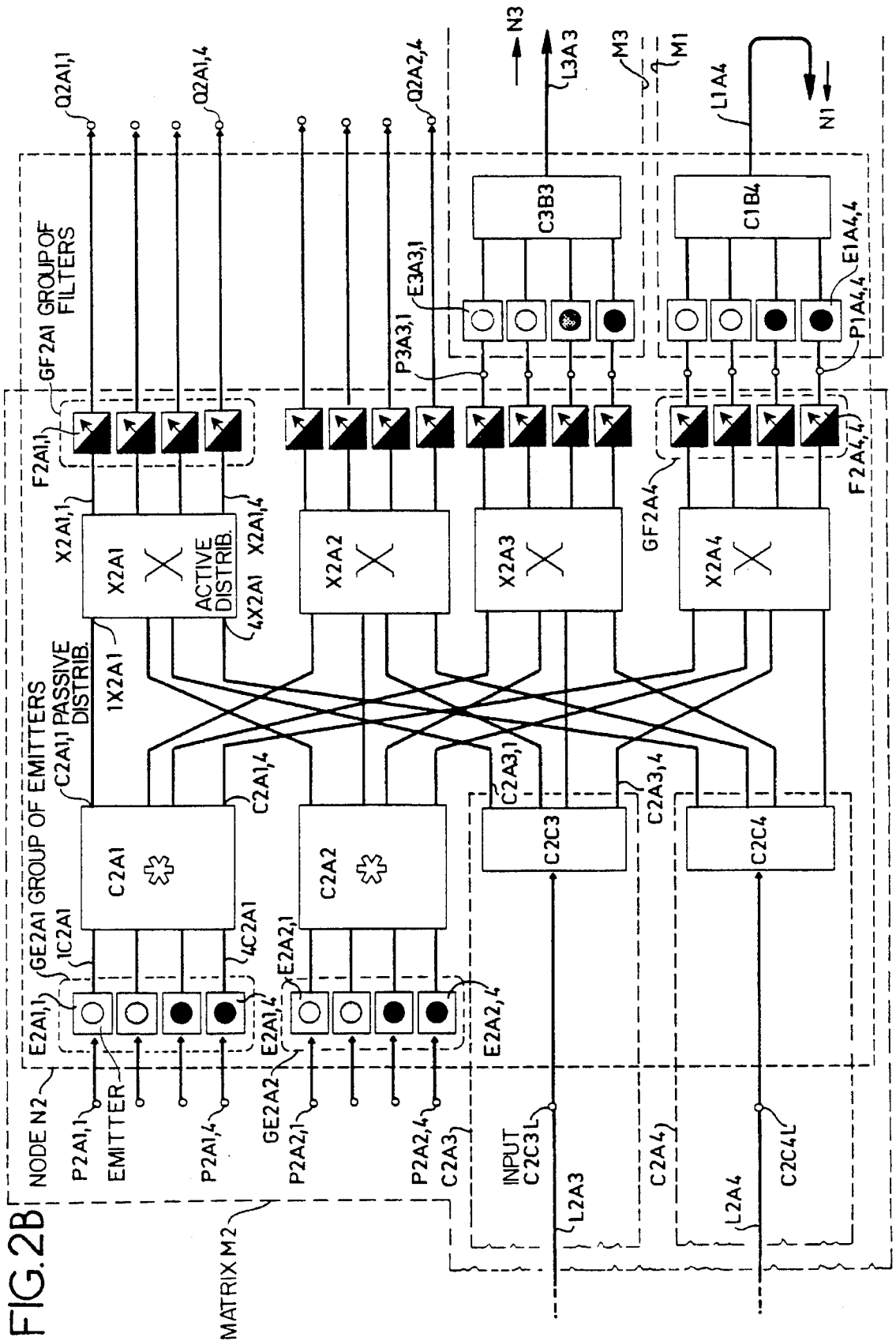

In FIG. 2B, in particular, at least said group of active distributors (X2A1, ..., X2A4) and said set of filters (F2A1,1, F2A4,4) of said Split matrix (M2) are contained in one of said nodes (N2) that is associated with the matrix, the split matrix including:

- a set of emitters (E2A1,1, ..., E2A4,4) constituted by a succession of groups of emitters (GE2A1, ..., GE2A4) in which the groups have respective ranks (1, ..., 4), each of said groups of emitters (GE2A1) being constituted by emitters (E2A1,1, ..., E2A1, 4) $i_n$ succession and having respective ranks (1, ..., 4) in the group, each of said emitters being provided with an input (P2A1,1, ..., P2A1,4) of the same rank for receiving aniitem of said data, the input constituting an input of said split matrix (M2), the emitter being controlled by the item of data so as to emit a light wave carrying the item of data and having one of said carrier wavelengths constituting a wavelength of the emitter;

- a group of passive distributors (C2A1, ..., C2A4) forming a succession in which the distributors have respective ranks (1, ..., 4), each of said passive distributors (C2A1) including a succession of inputs (1C2A1, ..., input being connected to the emitter which has the same rank as the input and which belongs to the group of emitters having the same rank as the distributor, the distributor forming a mixture of all the wave is, and further including outputs (C2A1,1, ..., C2A1,4), each of which transmits a group of waves constituted by a fraction of the mixture; and

- a group of active distributors (X2A1, ..., X2A4) in succession and having respective ranks (1, ..., 4) in the group, each of the active distributors (X2A1) including a succession of inputs (1X2A1, ..., M 4X2A1) having ranks (1, ..., 4) in the succession, each input being connected to an output of one of said passive distributors that has the same rank as the input, each of the active distributors further including a succession of outputs (X2A1,1, ..., X2A1,4), in which succession the outputs have respective ranks (1, ..., 4), the active distributor being controlled when it receives one of said groups of light waves via one of its inputs so as to select at least one of its outputs and so as to transmit the group of light waves via its selected output;

- a set of filters (F2A1,1, ..., F2A4,4) constituted by a succession of groups of filters (GF2A1, ..., GF2A4), in which succession the groups have respective ranks (1, ..., 4), each of said groups of filters (GF2A1) being constituted by filters (F2A1,1, ..., F2A1,4) in succession and having respective ranks (1, ..., 4) in the group, each of the filters (F2A1,1) of the group being connected to an output having the same rank as the filter and belonging to one of said active distributors (X2A1) that has the same rank as the group, each of the filters having a controlled wavelength constituted by one of Said carrier wavelengths, and feeding one of said outputs (Q2A1,1) of said split matrix (m2) so as to transmit selectively, at the output of the matrix, waves whose wavelength is that of the filter, at least some of said passive distributors of the split matrix constituting split distributors (C2A3, C2A4), each said split distributor (C2A3) comprising two separate portions, one portion constituting a wavelength multiplexer (C2B3), and the other portion constituting a demultiplexer (C2C3), the two portions being connected together via one of said link fibers (L2A3) that is associated with the split distributor, the demultiplexer (C2C3) constituting a resident portion of said split matrix, which portion is included in said node (N2) associated with the matrix (M2), and the multiplexer (C2B3) and said group of emitters (GE2A3) connected to the multiplexer constituting an exiled portion of the split matrix, the exiled portion being included in a host node (N1) associated with one of said composite matrices (M1), the hosti node being constituted by one of said nodes that is connected directly via said link fiDer (L23A) to the node (N2) associated with said split matrix (M2), the emitters (E2A3,1, ..., E2A3,4) included in the exiled portion being electrically fed via inputs (P2A3,1) (see FIG. 2A) provided with detection and amplification means or a wave length converter and optically fed via said filters included in said host node (N1), said multiplexer (C2B3) firstly including a succession of inputs (1C2A3, ..., 4C2A3) constituting said succession of inputs of the split distributor (C2A3), the multiplexer secondly including an output (C2B3L) constituting one of said link outputs of the associated node (N2), the demultiplexer (C2C3) (see FIG. 2B) including firstly an input (C2C3L) constituting one of said link inputs of the associated node, and secondly a succession of outputs (C2A3,1, ..., C2A3,4) constituting said succession of outputs of the split distributor, said output (C2B3L) of the multiplexer being connected to said input (C2C3L) of the demultiplexer via said link fiber (L2A3) associated with the split distributor, so that a plurality of said items of data are transmitted simultaneously between said associated node (N2) and said host node (N1) by means of wavelength multiplexing and via the fiber.

Preferably, said node (N2) associated with said split matrix (M2) is a local access node. The group of passive distributors (C2A1, ..., C2A4) of the matrix then further includes, for the purpose of local access, at least one of said passive distributors entirely included in the node and constituting an integrated distributor (C2A1, C2A2).

Figure 2C:
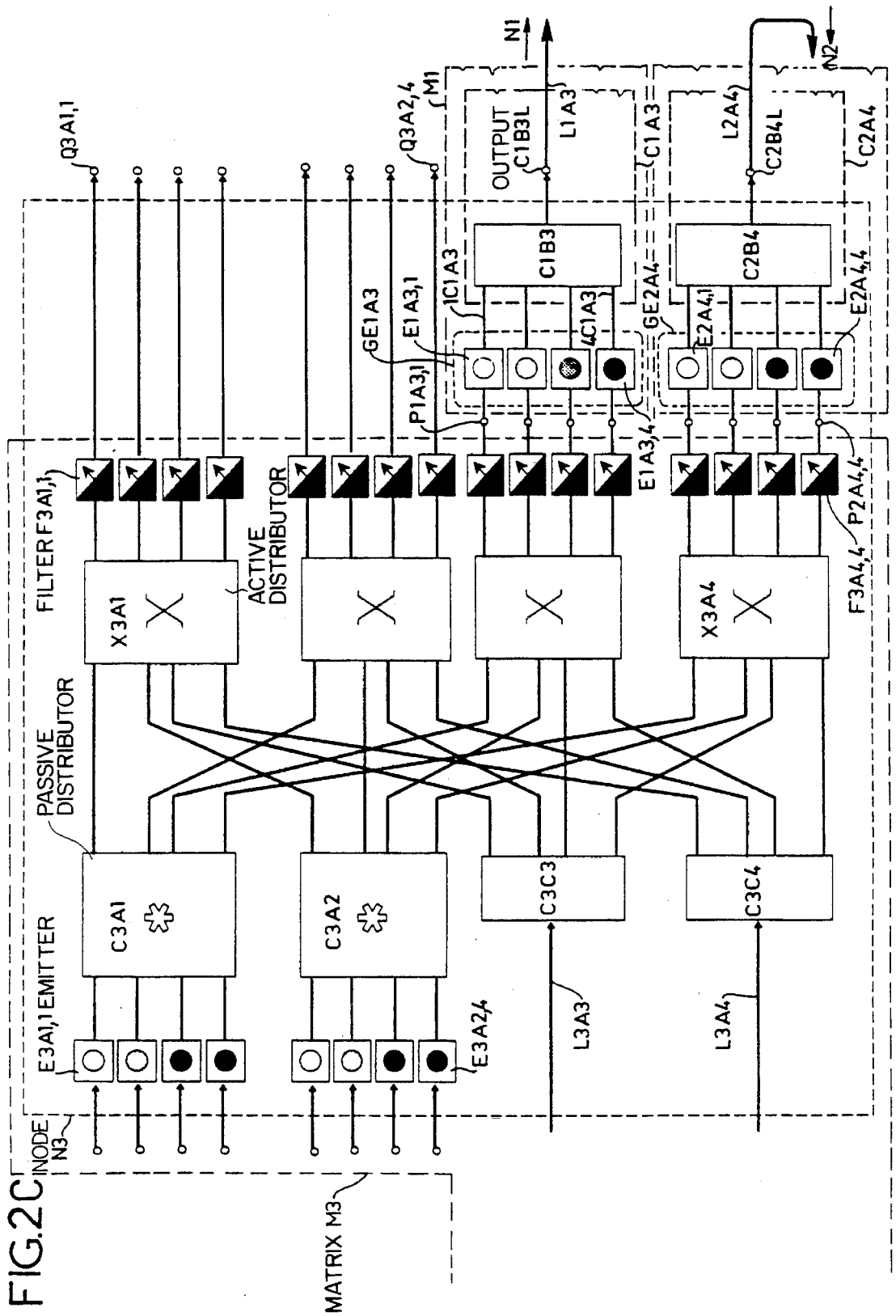

Preferably, said split matrix (M2) also includes a plurality of split distributors (C2A3, C2A4) forming a plurality of exiled portions (C2B3, FIG. 2A, C2B4, FIG. 2C) included in a plurality of host nodes (N1, N3) connected directly to the split matrix via a plurality of respective link fibers (L2A3, L2A4).

Preferably, the network also includes at least two split matrices (M1, M2) and two nodes (N1, N2) respectively associated with the two matrices, and at least two link fibers (L2A3, L1A4) conveying said data between the two nodes in two opposite directions.

We claim:

1. A transmission network for transmitting data, said network having a succession of carrier wavelengths for carrier light waves carrying said data, said network including:

- a plurality of nodes each having inputs and outputs, said inputs and outputs of said nodes including network inputs and network outputs for respectively receiving said data into said network and supplying back said data out from said network, said inputs and outputs of said each node further including at least one link input and/or at least one link output for receiving some of said data from another one of said nodes and/or for transmitting some of said data to another one of said nodes, each of said nodes having members some of which are controlled by internal control signals of said each node so as to control internal routes for said data inside said each node, each said internal route extending from a said input to a said output of said eaich node; and link fibers each for guiding some said carrier light waves from a said output of a said node to a said input of another said node so that said internal routes and said link fibers constitute complete routes for said data inside said network each from a said network input to a said network output;

at least some of said members of all the nodes constituting at the same time members of split matrices having inputs and outputs for respectively receiving and supplying back some of said data into and out from said each split matrix, at least some of said network inputs and outputs respectively constituting inputs and outputs of said split matrices, each said split matrix being mutually associated with one of said nodes, each said member of said each split matrix being either an exiled member which is a member of another node than said associated node or a resident member which is a member of said associated node, said members of said each split matrix including:

emitters having respective wavelengths in said succession of carrier wavelengths without being controlled by said internal control signals, each said emitter receiving some of said data at an input of said each split matrix, at least some of said emitters of said each split matrix being exiled emitters, each said emitter transmitting a said carrier light wave having the wavelength of said emitter and carrying the data said emitter has received;

passive distributors having inputs and outputs, each said passive distributor permanently connecting each of its inputs to all of its outputs, said inputs of each said passive distributor being fed by respective said emitters, at least one of said passive distributors having its inputs fed by said exiled emitters and being a split distributor including an exiled coupler and a resident splitter mutually connected by a said link fiber and respectively including said inputs and siaid outputs of said split distributor;

active distributors being resident members and having inputs, each said input receiving a plurality of said carrier light waves from a respective said output of said passive distributor, said active distributor also having outputs, each said active distributor connecting its inputs to its outputs along internal paths selected by said internal control signals of said associated node; and filters being resident members and having respective wavelengths which belong to said succession of carrier wavelengths and which are controlled by said internal control signals of said associated node, each said filter receiving a group of said carrier light waves from a said output of a said active distributor and selectively transmitting at an output of said each split matrix, those waves whose wavelength is equal to said wavelength of said filter.

2. A network according to claim 1, wherein said resident members of at least one said split matrix further includes:

any said emitter of said at least one split matrix which receives some of said data at a said input thereof constituted by a said network input; and any said passive distributor of said at least one split matrix which is fed by a said resident emitter of said at least one split matrix.

3. A network according to claim 1, wherein in the split matrix:

said emitters are arranged as a succession of groups of emitters each having respective ranks, each of said emitters in each of said groups having respective ranks in their respective said group, each of said emitters being provided with an input of the same rank for receiving an item of said data, the input being an input of said split matrix, the emitter being controlled by the item of data so as to emit a light wave carrying the item of data and having one of said carrier wavelengths which is the wavelength of said emitter;

said passive distributors are arranqed in a succession and have respective ranks, each of said inputs of said passive distributors being arranged in a succession and having ranks in the succession, each said input being connected to the emitter which has the same rank as the input and which belongs to the group of emitters having the same rank as the passive distributor, the passive distributor forming a mixture of all the waves, each of said outputs of said passive transmitter transmitting a group of waves constituted by a fraction of the mixture;

said active distributors are arranged in a succession and have respective ranks, each of said inputs of the active distributors being arranged in a succession and having ranks in the succession, each said input being connected to a said output of one of said passive distributors that has the same rank as the input, each of the outputs of the active distributors being arranged in a succession in which the outputs have respective ranks $(1, \ldots, 4)$, each said active distributor being controlled when receiving one of said groups of light waves via said selected output;

said filters are arranged in a succession of groups having respective ranks, said filters in each of said groups of filters being arranged in succession and having respective ranks in the group, each of the filters of the group being connected to an output having the same rank as the filter and belonging to one of said active distributors that has the same rank as the group;

said exiled coupler includes a succession of inputs constituting a succession of inputs of the split distributor, and an output constituting one of said link outputs of said another node in which said exiled coupler is resident; and said resident splitter includes an input constituting one of said link inputs of the associated node, and a succession of outputs constituting a succession of outputs of the split distributor, said output of the exiled coupler being connected to said input of the resident splitter via said link fiber associated with the split distributor.

4. A network according to claim 3, wherein said split matrix includes a plurality of said split distributors.

5. A network according to claim 4, including at least two of said split matrices and two nodes respectively associated with the two split matrices, and at least two of said link fibers conveying said data between the two nodes in two opposite directions.

* * * * *